United States Patent [19]

Okorodudu

[11] 3,919,095

[45] Nov. 11, 1975

[54] ORGANIC COMPOSITIONS CONTAINING ANTIOXIDANT AND ANTIWEAR ADDITIVES

[75] Inventor: Abraham O. M. Okorodudu, West Deptford, N.J.

[73] Assignee: Mobil Oil Corporation, New York, N.Y.

[22] Filed: July 30, 1973

[21] Appl. No.: 383,875

[52] U.S. Cl. ............... 252/46.6; 44/76; 44/DIG. 4; 252/400; 260/926; 260/979
[51] Int. Cl.² .......................................... C10M 1/48
[58] Field of Search ........ 252/46.6, 400; 44/DIG. 4, 44/76

[56] References Cited
UNITED STATES PATENTS

| | | | |
|---|---|---|---|
| 2,526,497 | 10/1950 | Mikeska | 252/46.6 |
| 2,531,129 | 11/1950 | Hook | 252/46.6 |
| 2,585,813 | 2/1952 | McDermott | 252/46.6 |
| 2,599,341 | 6/1952 | McDermott | 252/46.6 |
| 2,736,706 | 2/1956 | Morris | 252/46.6 |
| 3,071,548 | 1/1963 | Gleim | 252/46.6 |
| 3,271,312 | 9/1966 | Cyba | 252/46.6 X |
| 3,666,837 | 5/1972 | Rattenbury | 252/46.6 X |

*Primary Examiner*—Helen M. S. Sneed
*Attorney, Agent, or Firm*—Charles A. Huggett; Raymond W. Barclay; Benjamin I. Kaufman

[57] ABSTRACT

Organic compositions containing, in an amount sufficient to increase oxidative resistance and antiwear properties, esters of phosphorodithioic acids.

14 Claims, No Drawings

ORGANIC COMPOSITIONS CONTAINING ANTIOXIDANT AND ANTIWEAR ADDITIVES

BACKGROUND OF THE INVENTION

1. Field of the Invention

This invention relates to organic compositions, and, in one of its aspects, relates more particularly to organic compositions such as lubricating oils, greases, liquid hydrocarbon fuels, plastic materials and other organic compositions normally susceptible to oxidative deterioration or capable of permitting excessive wear of metal surfaces.

2. Description of the Prior Art

The prior art has long recognized that organic compositions such as lubricating oils (including mineral oil-based and synthetic oil-based compositions), liquid hydrocarbon fuels, plastic materials and other organic compositions, tend to undergo oxidative deterioration in storage and in use, particularly when subjected to heat and oxidizing conditions. The oxidation products thus formed are acidic in nature and exert a corrosive effect on metal surfaces with which they come into contact. In many instances oxidation also causes an increase in viscosity, thereby changing the character of the organic composition of the oil, grease or fuel. In this respect, many plastic materials are also susceptible to oxidation and can undergo color change, softening and also hardening by polymerization, cross-linking, embrittlement, cracking, crazing, reduced tensile strength, and loss of electrical properties. Such changes in character make the plastics less saleable from an aesthetic standpoint, particularly when the plastics are used as surface coatings or the packaging, and less desirable for other applications. As used herein, the term "plastics" is used broadly to include resins.

Various polymeric materials, including particularly those produced by polymerization of a polymerizable mixture containing at least one olefinic hydrocarbon, have in recent years become important in the manufacture of many useful articles. Such articles are generally manufactured and often used under conditions in which there is a tendency for the polymers to become oxidized. Particularly when those conditions include an elevated temperature, such as those employed to facilitate extrusion, molding or rolling of polymeric materials into useful configurations or those encountered in uses such as electrical insulation, the polymeric material usually undergoes oxidative degradation, which customarily results in an undesirable reduction of the tensile strength, flexibility or other advantageous properties of the polymeric materials. This is particularly evidenced by high-impact polystyrenes, which are formed by copolymerizing a rubbery material, such as a natural or a synthetic rubber.

Various antioxidants and stabilizers have been incorporated in such polystyrenes in the past to inhibit such oxidative degradation. Many of such additives have been insufficiently effective, while many others have caused undesirable side effects, such as excessive degradation of the color of the polymeric material and excessive change in the melt index (M.I.).

Still other materials are susceptible to oxidation, including foodstuffs, edible oils, soaps, waxes, cosmetics, essential oils and perfume bases.

Of particular significance, in accordance with the present invention, is the ability to increase oxidation resistance of lubricating media which may comprise liquid hydrocarbon oils, in the form of either a mineral oil or a synthetic oil, or in the form of a grease in which any of the aforementioned oils are employed as a vehicle. In general, mineral oils, employed as the lubricant, or grease vehicle, may be of any suitable lubricating viscosity range, as, for example, from about 45 SSU at 100°F. to about 6000 SSU at 100°F., and, preferably, from about 50 to about 250 SSU at 210°F. These oils may have viscosity indexes varying from below zero to about 100 or higher. Viscosity indexes from about 70 to about 95 are preferred. The average molecular weights of these oils may range from about 250 to about 800. Where the lubricant is to be employed in the form of a grease, the lubricating oil is generally employed in an amount sufficient to balance the total grease composition, after accounting for the desired quantity of the thickening agent, and other additive components to be included in the grease formulation.

In instances where synthetic oils, or synthetic oils employed as the vehicle for the grease, are desired in preference to mineral oils, or in combination therewith, various compounds of this type may be successfully utilized. Typical synthetic vehicles include polyisobutylene, polybutenes, hydrogenated polydecenes, polypropylene glycol, polyethylene glycol, trimethylol propane esters, neopentyl and pentaerythritol esters, di(2-ethyl hexyl) sebacate, di(2-ethyl hexyl) adipate, dibutyl phthalate, fluorocarbons, silicate esters, silanes esters of phosphorous-containing acids, liquid ureas, ferrocene derivatives, hydrogenated mineral oils, chain-type polyphenyls, siloxanes and silicones (polysiloxanes), alkyl-substituted diphenyl ethers typified by a butyl-substituted bis (p-phenoxy phenyl) ether, phenoxy phenylethers, etc.

Of still further significance, for the purpose of increasing oxidative resistance, is the treatment of petroleum distillate fuel oils having an initial boiling point from about 75°F. to about 135°F. and an end boiling point from about 250°F. to about 750°F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment hydrogenation, solvent-refining, clay treatment and the like.

The distillate fuel oils are characterized by their relatively low viscosity, pour point and the like. The principal property which characterizes these hydrocarbons, however, is their distillation range. As hereinbefore indicated, this range will lie between about 75°F. and about 750°F. Obviously, the distillation range of each individual fuel oil will cover a narrower boiling range, falling nevertheless within the above-specified limits. Likewise, each fuel oil will boil substantially, continuously throughout its distillation range.

Particularly contemplated among the fuel oils are Nos. 1, 2 and 3 fuel oils, used in heating and as diesel fuel oils, gasoline, turbine oil and jet combustion fuels. The domestic fuel oils generally conform to the specifications set forth in ASTM Specification D396-48T. Specifications for diesel fuels are defined in ASTM Specification D975-48T. Typical jet fuels are defined in Military Specification MIL-F-5624B.

Of further particular significance, in accordance with the present invention, is the ability to avoid excessive wear or deterioration of metal surfaces of machinery or engines operating under heavy load, employing various types of lubricants, and particularly of the nature of those hereinbefore described. Often, lubricants for such operations cannot prevent wear and corrosion of the metal and, as a result, machinery performance is affected. Lubricating oils and greases, heretofore blended with certain additives for the purpose of increasing antiwear properties, have not, however, always provided satisfactory protection. Lubricating compositions, therefore, having improved antiwear properties are of particular importance for such performance.

SUMMARY OF THE INVENTION

It has now been found that oxidative resistance and resistance to wear can be effectively increased by incorporating in organic compositions certain esters of phosphorodithioic acids having the structure:

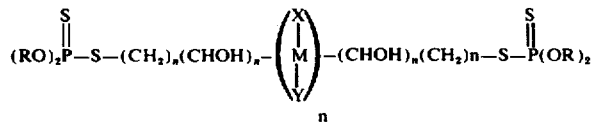

in which:

R is alkyl, aryl, alkaryl, aralkyl or cycloalkyl; M is carbon or sulfur; X is zero, oxygen or hydrogen; Y is zero, hydrogen or phenyl; $n$ is zero or a whole number and at least one $n$ is a whole number.

Representative examples of the above-described esters of phosphorodithioic acids are compounds having the structures:

(A)

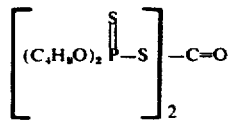

(B)

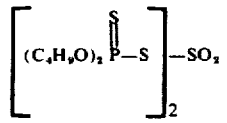

(C)

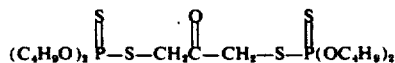

(D)

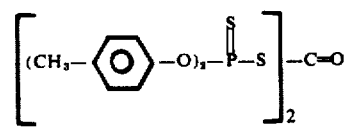

(E)

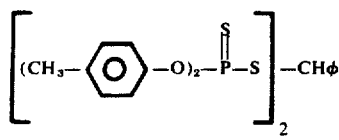

(F)

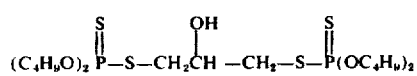

(G)

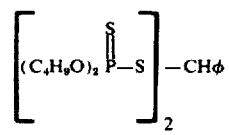

(H)

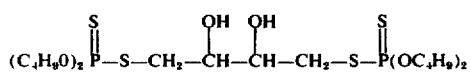

The esters of phosphorodithioic acids may be incorporated in the organic composition in any amount which is sufficient to increase oxidative resistance and antiwear properties. For most applications, the ester is employed in minor proportion, and generally in an amount from about 0.01 to about 10%, by weight, of the total weight of the composition. Particularly preferred are esters employed in an amount from about 0.1 to about 5%, by weight, of the total weight of the composition.

The esters of phosphorodithioic acids are prepared, in general, by reacting a phosphorodithioic acid with ammonia to produce the corresponding ammonium phosphorodithioate, and the latter is reacted with a reactive halide to produce the corresponding phosphorodithioic acid ester.

More specifically, the ammonium salt of the diorganophosphorodithioate is first dissolved in a suitable solvent, e.g., carbon tetrachloride, 1,2-dimethoxyethane, tetrahydrofuran and other solvents. A solution of the reactive halide is added dropwise over a period of approximately 1 to 2 hours, and the reaction mixture is refluxed for approximately 2 to 4 hours, cooled and filtered. The resulting filtrate is then washed with dilute caustic sodium hydroxide and stripped under vacuum to yield the desired product.

DESCRIPTION OF SPECIFIC EMBODIMENTS

In order to demonstrate the improvement in oxidation-resistance and antiwear properties realized by employing the above-described esters of phosphorodithioic acids in organic compositions, comparative data were obtained as shown in the examples of the following tables.

EXAMPLE 1

130 grams (0.5 moles) of ammonium dibutylphosphorodithioate were charged into a reaction flask and sufficient dimethoxyethane were added to obtain a clear solution at 35°C. 24.5 grams (0.25 moles) of phosgene were added dropwise over a period of 1 hour. Following the resulting exothermic reaction, the reaction mixture was refluxed for a period of 6 hours, cooled and the precipitate was filtered off. The resulting filtrate was diluted with benzene ether, washed with 5% potassium hydroxide, dried over magnesium sulfate and stripped under vacuum to produce a phosphorodithioic acid ester having the above-described structure A. Analysis of this product disclosed the following:

| Calculated: | P 12.2 | S 25.1 |
| Found: | P 12.6 | S 23.7 |

EXAMPLE 2

Following the procedure described in Example 1, and employing the same conditions, 194 grams (0.75 moles) of ammonium dibutylphosphorodithioate and 51 grams (0.37 moles) of sulfuryl chloride were reacted to produce a phosphorodithioic acid ester having the above-described structure B. Analysis of this product disclosed the following:

| Calculated: | P 11.4 | S 29.3 |
| Found: | P 12.9 | S 25.5 |

EXAMPLE 3

Following the procedure described in Example 1, and employing the same conditions, 259 grams (1 mole) of ammonium dibutylphosphorodithioate and 63 grams (0.5 moles) of 1,3-dichloropropanone were reacted to produce a phosphorodithioic acid ester having the above-described structure C. Analysis of this product disclosed the following:

| Calculated: | P 11.5 | S 23.8 |
| Found: | P 11.5 | S 23.1 |

EXAMPLE 4

Following the procedure in Example 1, and employing the same conditions, 164 grams (0.5 moles) of ammonium ditolylphosphorodithioate and 24 grams (0.25 moles) of phosgene were reacted to produce a phosphorodithioic acid ester having the above-described structure D. Analysis of this product produced the following:

| Calculated: | P 9.5 | S 19.8 |
| Found: | P 10.9 | S 18.8 |

EXAMPLE 5

Following the procedure described in Example 1, and employing the same conditions, 82 grams (0.25 moles) of ammonium ditolylphosphorodithioate and 20 grams (0.125 moles) of α,α-dichlorotoluene were reacted to produce a phosphorodithioic acid ester having the above-described structure E. Analysis of this product disclosed the following:

| Calculated: | P 8.8 | S 18.1 |
| Found: | P 10.6 | S 17.7 |

EXAMPLE 6

Following the procedure in Example 1, and employing the same conditions, 130 grams (0.5 moles) of ammonium dibutylphosphorodithioate and 23 grams (0.25 moles) of epichlorohydrin were reacted to produce a phosphorodithioic acid ester having the above-described structure F. Analysis of this product disclosed the following:

| Calculated: | P 11.5 | S 23.7 |
| Found: | P 10.6 | S 23.0 |

EXAMPLE 7

Following the procedure described in Example 1, and employing the same conditions, 130 grams (0.5 moles) of ammonium dibutylphosphorodithioate and 40.3 grams (0.25 moles) of α,α-dichlorotoluene were reacted to produce a phosphorodithioic acid ester having the above-described structure G. Analysis of this product disclosed the following:

| Calculated: | P 10.8 | S 22.4 |
| Found: | P 9.4 | S 22.3 |

EXAMPLE 8

Following the procedure described in Example 1, and employing the same conditions, 65 grams (0.25 moles) of ammonium dibutylphosphorodithioate and 20 grams (0.125 moles) of 1,4-dichloro-2,3-butanediol were reacted to produce a phosphorodithioic acid ester having the above-described structure H. Analysis of this product disclosed the following:

| Calculated: | P 10.9 | S 22.5 |
| Found: | P 8.8 | S 20.8 |

In order to demonstrate the improvement in oxidation-resistance properties realized by employing the above-described novel esters of phosphorodithioic acids in organic compositions, compared with that present in the untreated organic composition, comparative data were obtained as shown in the following Table I.

The data were obtained by means of an antioxidant test, as described in U.S. Pat. No. 3,497,181. In general, in carrying out this test, the antioxidant is added to a solvent-refined mineral lubricating oil. The oil is then heated to 163°C. and dry air at a rate of 10 pounds per hour is passed through it in the presence of iron, copper, aluminum and lead. After 40 hours, the neutralization number (NN) for each oil composition is obtained according to ASTM Method D-741-1. The effectiveness of the antioxidants is revealed by a comparison of the control of acids (change in neutralization number) with the antioxidant-free oil. The oil employed in accordance with the test results shown in the following table comprised a solvent-refined mineral lubricating oil, having a 128/132 SSU viscosity at 100°F. and a 390°F. minimum flash point. In the data of the table all percentages are expressed in weight percent.

TABLE I

| Lubricant Formulation | Additive Conc. (Wt. %) | NN Increase |
| --- | --- | --- |
| Base Oil | | 17.0 |

TABLE I-continued

| Lubricant Formulation | Additive Conc. (Wt. %) | NN Increase |
|---|---|---|
| Base Oil + Ex. 1 | 1.0 | 0.41 |
| Base Oil + Ex. 2 | 1.0 | 2.40 |
| Base Oil + Ex. 3 | 1.0 | 0.46 |
| Base Oil + Ex. 4 | 1.0 | 0.55 |
| Base Oil + Ex. 5 | 1.0 | 0.90 |
| Base Oil + Ex. 6 | 1.0 | 1.30 |
| Base Oil + Ex. 7 | 1.0 | 1.30 |
| Base Oil + Ex. 8 | 1.0 | 0.50 |

As will be apparent from the data of Table I, the esters of phosphorodithioic acids of the present invention are markedly effective as antioxidants, as shown by the relatively low NN increase even when they are present in low concentrations.

In order to demonstrate the improvement in antiwear properties realized by employing the above-described novel esters of phosphorodithioic acids in organic compositions, compared with that present in the untreated organic composition, comparative data were obtained in accordance with the standard Four-Ball Wear Test. This test is described In U.S. Pat. No. 3,423,316. In general, in this test, three steel balls of 52-100 steel are held in a ball cup. A fourth ball positioned on a rotatable vertical axis is brought into contact with the three balls and is rotated against them. The force which the fourth ball is held against the three stationary balls may be varied according to a desired load. The test lubricant is added to the ball cup and acts as a lubricant for the rotation. At the end of the test, the steel balls are investigated for wear - scar; the extent of scarring represents the effectiveness of the lubricant as an antiwear agent. The oil employed in accordance with the test results shown in the following Table II comprised a solvent-refined mineral lubricating oil having a 239.1 SSU viscosity at 100°F. and a 475°F. minimum flash point. In the data of the table, the additives were employed in concentrations of 1%, by weight.

TABLE II

4-Ball Wear Test-Scar Diameter(mm)
½" Balls, 52-100 Steel, 60 Kg, ½hr.

| Lubricant Formulation | Temp. °F. | Speed 500 RPM | 1000 RPM |
|---|---|---|---|
| Base Oil | 200 | 0.55 | 0.85 |
|  | 390 | 1.40 | 1.50 |
| Base Oil + Ex. 1 | 200 | — | 0.63 |
|  | 390 | 0.45 | 0.51 |
| Base Oil + Ex. 2 | 200 | — | 0.55 |
|  | 390 | 0.50 | 0.72 |
| Base Oil + Ex. 3 | 200 | — | 0.52 |
|  | 390 | 0.56 | 0.71 |
| Base Oil + Ex. 4 | 200 | — | 0.56 |
|  | 390 | 0.56 | 0.56 |
| Base Oil + Ex. 5 | 200 | 0.60 | 0.83 |
|  | 390 | 0.60 | 0.63 |
| Base Oil + Ex. 6 | 200 | — | 0.55 |
|  | 390 | 0.55 | 0.68 |
| Base Oil + Ex. 7 | 200 | — | 0.90 |
|  | 390 | 0.56 | 0.65 |
| Base Oil + Ex. 8 | 200 | — | 0.49 |
|  | 390 | 0.55 | 0.63 |

It will be apparent from the data of Table II that the esters of phosphorodithioic acids of the present invention are markedly effective as antiwear additives.

While this invention has been described with reference to preferred compositions and components therefor, it will be understood, by those skilled in the art, that departure from the preferred embodiments can be effectively made and are within the scope of the specification.

I claim:

1. An organic composition selected from the group consisting of lubricating oils, greases and liquid hydrocarbon fuels, containing, in an amount sufficient to increase oxidative resistance and antiwear properties, a compound having the following structure:

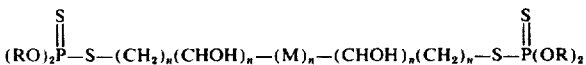

in which:

R is alkyl, aryl, alkaryl, aralkyl or cycloalkyl; M is

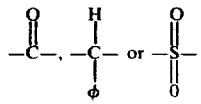

$n$ is zero or a whole number and at least one $n$ is a whole number.

2. A composition as defined in claim 1 wherein said compound has the structure:

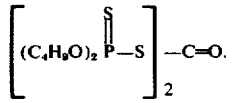

3. A composition as defined in claim 1 wherein said compound has the structure:

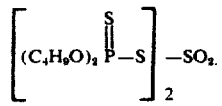

4. A composition as defined in claim 1 wherein said compound has the structure:

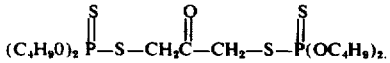

5. A composition as defined in claim 1 wherein said compound has the structure:

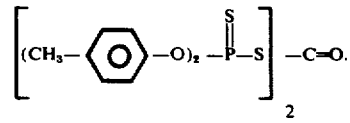

6. A composition as defined in claim 1 wherein said composition comprises a mineral oil-based composition.

7. A composition as defined in claim 1 wherein said composition comprises a synthetic oil-based composition.

8. A composition as defined in claim 1 wherein said composition comprises a liquid hydrocarbon fuel.

9. A composition as defined in claim 1 wherein said composition comprises an oil of lubricating viscosity in the range from about 45 SSU at 100°F. to about 6000 SSU at 100°F.

10. A composition as defined in claim 1 wherein said composition comprises an oil of lubricating viscosity in the range from about 50 SSU at 210°F. to about 250 SSU at 210°F.

11. A composition as defined in claim 1 wherein said composition comprises a grease.

12. A composition as defined in claim 1 wherein said compound is present in minor proportion.

13. A composition as defined in claim 1 wherein said compound is present in an amount from about 0.01 to about 10%, by weight, of the total weight of said composition.

14. A composition as defined in claim 1 wherein said compound is present in an amount from about 0.1 to about 5%, by weight, of the total weight of said composition.

* * * * *